No. 700,419. Patented May 20, 1902.
D. HAMMOND.
COMBINED SHAPE METAL CUTTING, COPING, AND UPSETTING MACHINE.
(Application filed Aug. 2, 1895.)
(No Model.) 3 Sheets—Sheet 1.
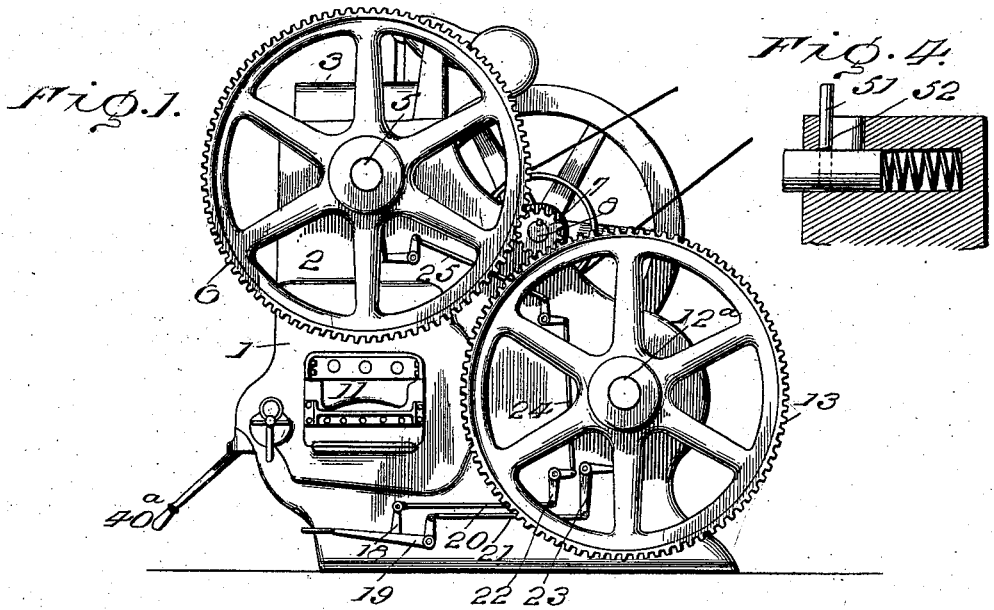
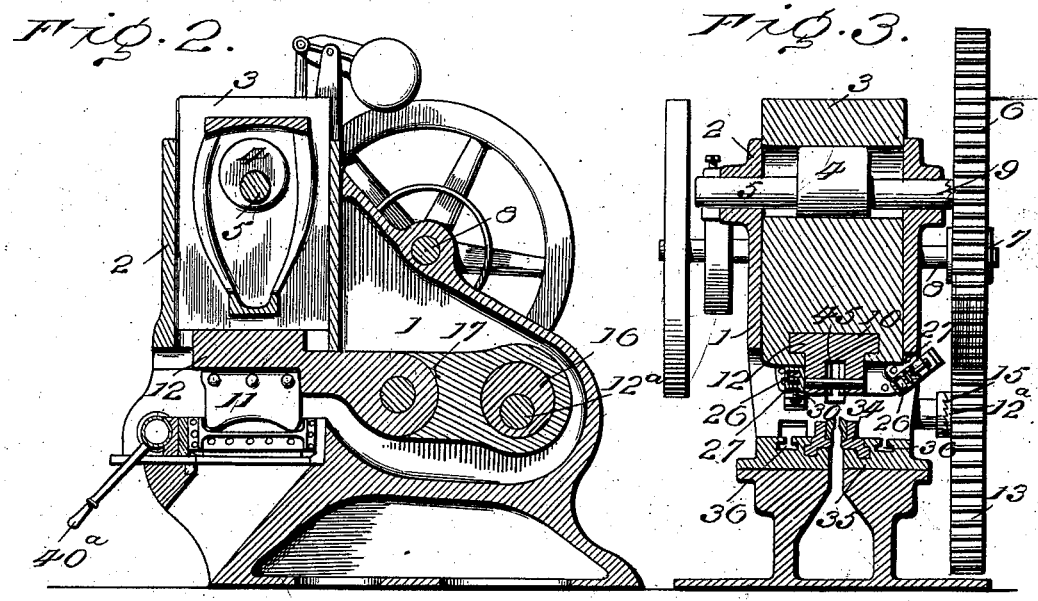
Inventor
David Hammond,
Witnesses.
Percy L. Wooldridge
Jno. Imrie
By H. W. Bond
Atty.
THE NORRIS PETERS CO., PHOTO-LITHO., WASHINGTON, D. C.

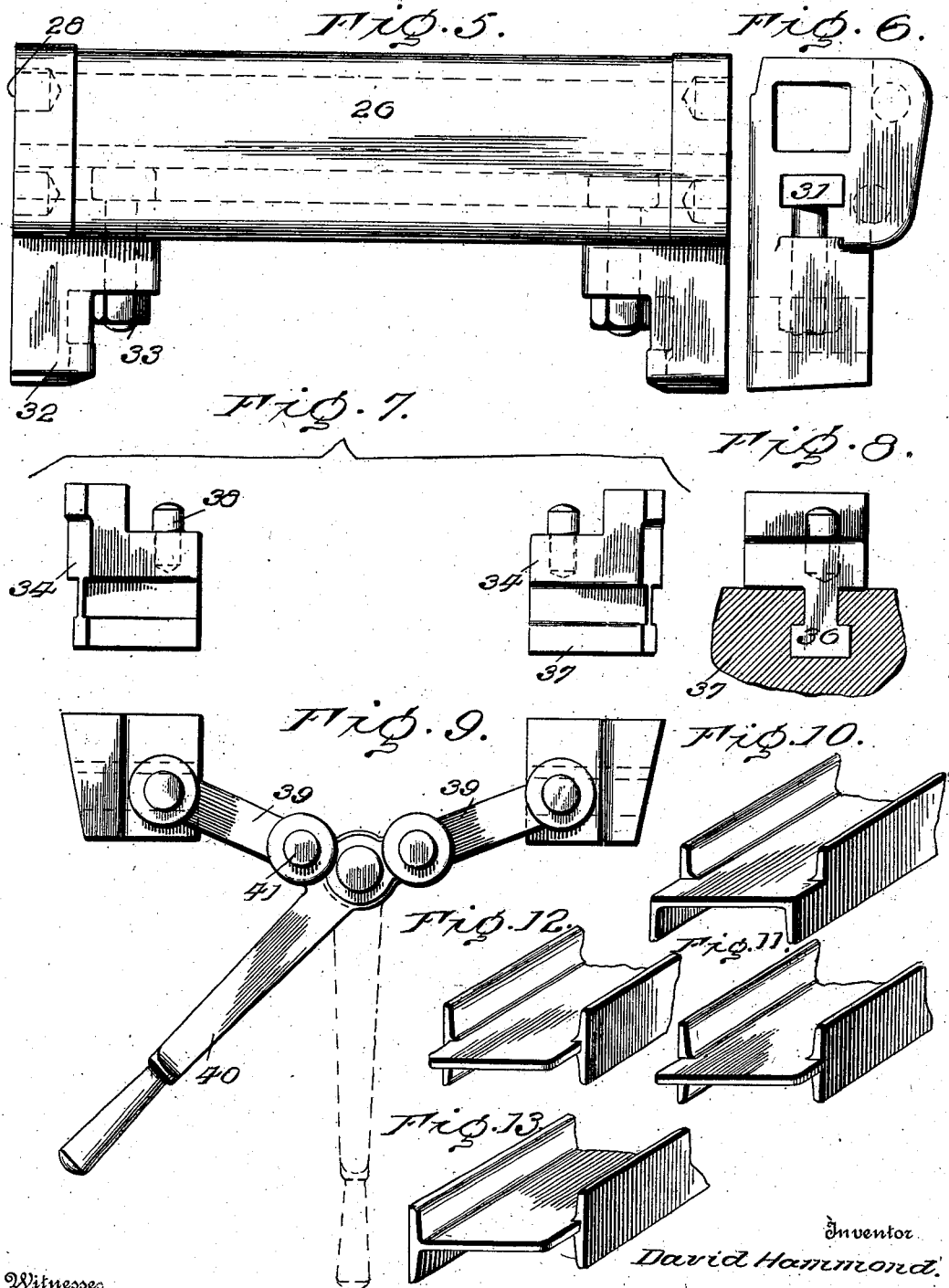

No. 700,419. Patented May 20, 1902.
D. HAMMOND.
COMBINED SHAPE METAL CUTTING, COPING, AND UPSETTING MACHINE.
(Application filed Aug. 2, 1895.)
(No Model.) 3 Sheets—Sheet 3.
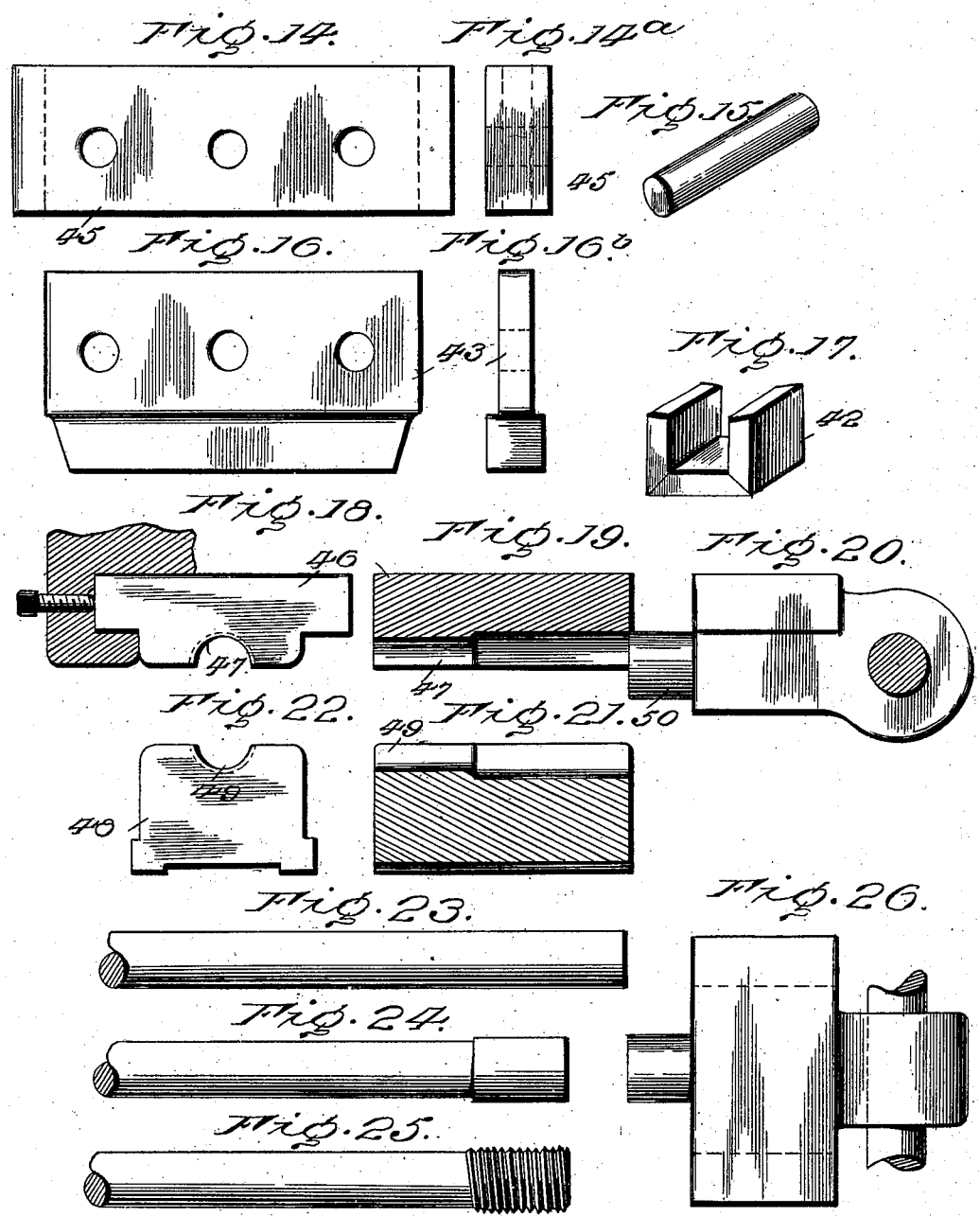

UNITED STATES PATENT OFFICE.

DAVID HAMMOND, OF CANTON, OHIO.

COMBINED SHAPE-METAL CUTTING, COPING, AND UPSETTING MACHINE.

SPECIFICATION forming part of Letters Patent No. 700,419, dated May 20, 1902.

Application filed August 2, 1895. Serial No. 557,964. (No model.)

*To all whom it may concern:*

Be it known that I, DAVID HAMMOND, a citizen of the United States, residing at Canton, in the county of Stark and State of Ohio, have invented certain new and useful Improvements in a Combined Shape-Metal Cutting, Coping, and Upsetting Machine; and I do hereby declare that the following is a full, clear, and exact description of the same, reference being had to the annexed drawings, making a part of this specification, and to the figures of reference marked thereon, in which—

Figure 1 is a side elevation. Fig. 2 is a longitudinal sectional view. Fig. 3 is a transverse sectional view. Fig. 4 is a view showing one of the blade-retaining pins. Fig. 5 is a detached view of the coping-bar, showing the coping-blades attached thereto. Fig. 6 is an end view of the coping-bar, showing the coping-blade attached thereto. Fig. 7 shows views of the lower coping-dies. Fig. 8 is a view showing a portion of the bed and its T-shaped opening for securing the lower dies. Fig. 9 is a view showing the adjusting-lever and its links for adjusting the lower dies. Fig. 10 is a view showing a portion of the beam and illustrating the first operation performed upon the beam. Fig. 11 is a similar view showing the second operation performed upon the beam. Fig. 12 is a view showing a portion of the beam and illustrating the coping completed. Fig. 13 is a view showing a portion of the beam and illustrating the beam coped upon one side only. Fig. 14 is a side elevation of the blade's socket. Fig. 14ª is an end view of the blade's socket. Fig. 15 is a detached view of one of the blade's retaining-pins. Fig. 16 is a detached view of the coping-blade. Fig. 16ª is an end view of the coping-blade. Fig. 17 is a view illustrating one of the side coping-dies. Fig. 18 is an end view of the upper clamping-die. Fig. 19 is a longitudinal section of the upper clamping-die. Fig. 20 is a side view of the upsetting-plunger, showing a transverse section of its connecting cross-bar. Fig. 21 is a longitudinal section of the lower clamping-die. Fig. 22 is an end view of the lower clamping-die. Fig. 23 is a view showing a bar before any operation has been performed upon it or before the same has been upset. Fig. 24 is a view showing a bar properly upset. Fig. 25 is a view showing a bar completely upset and the screw-threads properly formed thereon. Fig. 26 is a top view of the upsetting-plunger and its connecting point or bar.

The present invention has relation to combined shape-metal cutting, coping, and upsetting machines; and it consists in the different parts and combination of parts hereinafter described, and particularly pointed out in the claim.

Similar numbers represent corresponding parts in all of the figures of the drawings.

In the accompanying drawings, 1 represents the body or frame of the machine, which is constructed of a size and of sufficient strength and weight to carry out the objects and purposes hereinafter described. To the body or frame is attached the casing or shell 2, within which is located the plunger-head 3, which plunger-head, together with the different parts attached thereto, is given a reciprocating motion by means of the cam 4 or its equivalent, which cam is located upon the shaft 5, to which shaft is loosely attached the propelling-wheel 6, which wheel meshes with the pinion 7, said pinion being securely attached to the power-shaft 8.

For the purpose of throwing the plunger-head 3 out of operation the sliding clutch 9 is provided, said sliding clutch being mounted upon the shaft 5 and is operated in any convenient and well-known manner.

For the purpose of providing for both horizontal and vertical movement of the various blades to be attached to the plunger-head in T-shaped opening 10. (Best seen in Fig. 3.)

When it is desired to use the machine for cutting the webs and flanges of I-beams or channel-bars, the blade 11 is attached to the sliding head 12, which sliding head is located in the T-shaped opening 10, as illustrated in Fig. 3, and the blade attached to the sliding head by means of suitable bolts or their equivalents. The plunger 3, together with the sliding head 12, is given a full downstroke by rotating the shaft 5 and stopping the rotation of said shaft by means of the clutch 9, at which time the blade 11 has been passed through the web of the beam being operated upon. Rotary motion is communicated to the shaft 12ª by means of the wheel 13 and the pinion 7, together with the clutch 15, or their equivalents. Said shaft 12ª is given a full rotation, thereby giving to the blade 11 a complete backward-and-forward stroke by means of the eccentric 16 or its equivalent and the pitman 17 or its equivalent, said pitman being pivotally connected to the sliding head 12, thereby removing or cutting the flanges of the beam. After the sliding head 12 has been given a full backward-and-forward movement the plunger 3 is elevated, which brings the different parts of the machine proper into position for the next cut. For the purpose of operating the clutches 9 and 15 the foot-levers 18 and 19 are provided, which foot-levers are properly connected with the clutches by means of rods and levers, such as 20, 21, 22, 23, 24, and 25; but this arrangement may be varied, inasmuch as any well-known mechanism may be used for operating the clutches without departing from the nature of my invention.

For the purpose of placing the power-shaft and the shafts 5 and 12ª parallel with each other the shaft 5 is located through the plunger 3 and its shell or casing transversely to the length of the blade 11, as illustrated in Figs. 1, 2, and 3. The object and purpose of so locating the shafts 8, 5, and 12ª parallel to each other is to provide for the straight-faced gearing, or, in other words, to do away with beveled gearing, thereby bringing the pinion 7 into direct action with the wheels that drive the shafts for producing vertical and horizontal and reciprocating movements to the head carrying the cutting-blade 11.

When it is desired to use the machine for coping purposes, the bar 26 is attached to the plunger 3 by means of the socket-bearings 27. The bar 26 is provided with the T-shaped opening 30, which T-shaped opening is located in the bottom or lower portion of the bar 26 and receives the T-shaped bolt-head 31, thereby providing for adjusting the coping-blade 32 at any desired point with reference to the coping-bars 26, thereby providing for properly coping different-size beams. After the coping-blades 32 have been properly adjusted upon the bar 26 they are securely held at the desired point of adjustment by means of the nuts 33, which nuts are located upon the screw-threaded portions of the T-shaped bolts 31.

For the purpose of providing lower dies to be used in connection with the coping-blades 32 the dies 34 are provided, which dies when brought into proper adjustment with reference to the coping-blades 32 are located directly below the bottom ends of the coping-blades. For the purpose of holding the dies 34 in proper position with reference to the bed 35 said bed is provided with the T-shaped opening 36, which T-shaped opening receives the T-shaped lower ends of the dies 34, said T-shaped lower portions 37 being located with reference to the bed substantially as illustrated in Fig. 8.

For the purpose of providing a means for adjusting the lower dies 34, so as to bring them into proper position with reference to the various-sized beams, the pins 38 are attached to said dies, to which pins are connected the links 39, said links being connected at their inner ends to the head of the lever or handle 40 by means of the connecting-pins 41. It will be understood that as the handle 40 is moved out of a right-angled position the dies 34 will be forced away from each other, and as the handle 40 approaches a position at right angles to the bed of the machine proper the dies will be forced toward each other, thereby providing for the adjustment of the lower dies in either direction and at the same time providing for uniform adjustment for each of the dies 34. It will be understood that the handle 40 is to be pivoted to the frame of the machine.

For the purpose of providing side dies for the flanges of I-beams or channel-bars the die 42 is provided, which die is located in the bed of the machine, it being understood that two dies, such as 42, (see Fig. 17,) are to be employed.

For the purpose of providing a coping-blade designed for removing the upper flanges of I-beams or channel-bars the blade 43, Fig. 16, is provided, which blade takes the place of the blade 11 and is attached to the head by means of the socket 45, which socket is permanently attached to the plunger-head and is provided with an opening to receive the top or upper part of the coping-blade 43.

The top or upper portion of the coping-blade and the cutting-blade are formed alike, so that the blades can be interchanged, thereby providing for either coping or cutting I-beams or channel-bars.

When it is desired to use the machine as an upsetting-machine, the clamping-die 46 is attached to the plunger-head 3 and takes the place of the coping and cutting blades 43 and 11, and, as shown, said clamping-die is provided with the semicircular recess or groove 47. Below the clamping-die 46 is located the lower clamping-die 48, which lower clamping-die is attached to the bed of the machine. As illustrated in Figs. 19 and 21, the semicircular grooves 47 and 49 are formed of different diameters or sizes, thereby providing or forming room for the proper upsetting of the bars.

It will be understood that when the machine is to be used for upsetting purposes the plunger 50 is to take the place of the sliding head 12.

The purpose of providing the socket 45, or rather a casing for the various blades designed to be placed in the socket, is to provide against accidents to the slot formed in the plunger-head 3, as it will be understood that if in the event the opening that receives the various cutting-blades should be injured a new socket can be inserted at much less expense than would be required to provide an entire new plunger-head.

In Fig. 4 a detached view of the coping bar-connecting pins is illustrated, it being understood that there are to be four of said pins used in connecting the bar, and when it is desired to place the bar in position to bring said bar or bars and other dies or cutting-blades into proper position for use the bar or bars are placed in the position illustrated upon the left-hand side in Fig. 3, and when it is desired to bring one or both of the bars 26 out of operative position they are turned upward, as illustrated upon the right-hand side, Fig. 3. It will be understood that by removing the socket-bearings or pins 27, or rather the lower set of said pins, the bar or bars will be free to turn upon the upper set of pins 27, and for the purpose of providing a means for operating the pins or socket-bearings 27 they are each provided with the short handles 51, which handles are so located that they can be reached by the hand, said handles extending through openings 52.

As above described, the machine when to be used for coping it is necessary that the bar 26 be attached to the plunger 3 by means of suitable socket-bearings so located that they will receive the sockets 28, this arrangement being necessary, so that the coping can be done upon the machine without adding additional expense.

It will be understood that the operation of the machine so far as its different parts is concerned is substantially the same except that the tools must be especially designed for coping purposes.

It will be understood that when the lever or handle 40 is moved in one direction the dies will be brought toward each other and when moved in the opposite direction will be forced away from each other, thereby adjusting a means for adjusting the lower dies.

Having fully described my invention, what I claim as new, and desire to secure by Letters Patent, is—

The combination of a frame provided with a shell, having located therein a reciprocating plunger a sliding head connected to the plunger, a pitman connected to the sliding head, the parallel shafts 5 and 12$^a$ having mounted on said shafts wheels 6 and 13, clutch mechanism for throwing the shafts in and out of gear and means for imparting reciprocating motion to the plunger and to the sliding head, substantially as and for the purpose specified.

In testimony that I claim the above I have hereunto subscribed my name in the presence of two witnesses.

DAVID HAMMOND.

Witnesses:
F. W. BOND,
BERTHA FINCH.